(12) United States Patent
Holzbauer (10) Patent No.: US 11,219,335 B2
(45) Date of Patent: Jan. 11, 2022

(54) FEED CHUTE FOR A FOOD PROCESSOR

(71) Applicant: KONINKLIJKE PHILIPS N.V., Eindhoven (NL)

(72) Inventor: Juergen Holzbauer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 156 days.

(21) Appl. No.: 16/315,862

(22) PCT Filed: Jul. 4, 2017

(86) PCT No.: PCT/EP2017/066541
§ 371 (c)(1),
(2) Date: Jan. 7, 2019

(87) PCT Pub. No.: WO2018/011003
PCT Pub. Date: Jan. 18, 2018

(65) Prior Publication Data
US 2019/0239695 A1 Aug. 8, 2019

(30) Foreign Application Priority Data
Jul. 11, 2016 (EP) .................................. 16178840

(51) Int. Cl.
*A47J 43/046* (2006.01)
*A47J 43/07* (2006.01)

(52) U.S. Cl.
CPC ......... *A47J 43/0794* (2013.01); *A47J 43/046* (2013.01); *A47J 43/0716* (2013.01); *A47J 43/0761* (2013.01)

(58) Field of Classification Search
CPC .. A47J 43/0761; A47J 43/046; A47J 43/0716; A47J 43/075; B02C 23/04
See application file for complete search history.

(56) References Cited

U.S. PATENT DOCUMENTS

| D251,407 | S | * | 3/1979 | Tsuji | .............................. D7/384 |
| 4,397,427 | A | | 8/1983 | Howard | |
| 5,218,196 | A | * | 6/1993 | Dogul | ....................... G01V 8/20 |
| | | | | | 250/221 |
| 2005/0056160 | A1 | | 3/2005 | Mulle | |
| 2007/0228196 | A1 | * | 10/2007 | Abramson | .............. B02C 25/00 |
| | | | | | 241/37.5 |

(Continued)

FOREIGN PATENT DOCUMENTS

| CN | 203106864 U | 8/2013 |
| JP | 2015019918 A | 2/2015 |

(Continued)

OTHER PUBLICATIONS

Cuisineart, Food Processor Model DLC-10E Instructions and Recipes, 1981, Cuisinearts, Inc (Year: 1981).*

*Primary Examiner* — Debra M Sullivan
*Assistant Examiner* — Dylan Schommer
(74) *Attorney, Agent, or Firm* — Schott, P.C.

(57) ABSTRACT

A feed chute having a feed opening cooperating with a transparent pusher is disclosed. The transparent pusher is dimensioned to slide through the feed chute to push food articles into a food processor for processing by a food processing element. The feed chute comprises at least one signal processor disposed on the interior surface of the feed chute to ensure consumer safe operation.

16 Claims, 6 Drawing Sheets

(56) References Cited

U.S. PATENT DOCUMENTS

| | | |
|---|---|---|
| 2008/0111011 A1 | 5/2008 | Wang |
| 2012/0085847 A1 | 4/2012 | Filipitsch |
| 2014/0021278 A1* | 1/2014 | Armstrong .......... A47J 43/0772 241/37.5 |

FOREIGN PATENT DOCUMENTS

| | | |
|---|---|---|
| TW | 469753 U | 1/2014 |
| WO | 2012075525 A1 | 6/2012 |

* cited by examiner

FEED CHUTE FOR A FOOD PROCESSOR

This application is the U.S. National Phase application under 35 U.S.C. § 371 of International Application No. PCT/EP2017/066541, filed on Jul. 4, 2017, which claims the benefit of International Application No. 16178840.1 filed on Jul. 11, 2016. These applications are hereby incorporated by reference herein.

FIELD OF THE INVENTION

The present subject matter relates to food processors and more specifically to a feed chute assembly for a food processor.

BACKGROUND OF THE INVENTION

Patent U.S. Pat. No. 4,397,427 discloses a device and method for feeding a food processor. The disclosed food processor comprises a feed chute assembly. The feed chute assembly is arranged to receive food articles to be processed. There are possibilities that the consumer may unintentionally grab into the feed opening e.g., while decluttering, cleaning or pushing the food articles, while the food processor is in operation. This could result in harmful injuries to the consumer.

SUMMARY OF THE INVENTION

It is an object of the invention to provide an improved feed chute assembly for a food processor that ensures consumer safe operation. The invention is defined by the independent claims. The dependent claims define advantageous embodiments.

The object of the invention is realized by providing a feed chute having a feed opening cooperating with a transparent pusher. The transparent pusher is dimensioned to slide through the feed chute to push food articles into a food processor for processing by a food processing element. The feed chute comprises at least one signal processor disposed on the interior surface of the feed chute.

The disclosed invention provides an inbuilt safety mechanism to prevent the consumer (user) from harmful injuries that could arise during harmful situations (e.g., while the consumer unintentionally grabs into the feed opening i.e., while decluttering, cleaning or pushing food articles, while the food processor is in operation).

This is realized by providing at least one signal processor disposed on the interior surface or on top of the feed chute. The at least one signal processor is provided with signal processing algorithms configured to discriminate between discontinuous food pieces being entered and a feed continuous human finger, hand or arm reaching into the feed chute. The signal processing algorithms are further configured to ascertain whether it is continuous human hand/arm/finger and if so notify the consumer. This could prevent the consumer from harmful injuries.

In an embodiment, the at least one signal processor is configured to process signals received from at least one sensor disposed on the interior surface of the feed chute. This embodiment has the advantage that the sensor could be configured to gather valuable piece of information that could help the signal processor to distinguish human hand/finger/arm from food articles.

In a further embodiment, the at least one sensor is disposed on the interior surface of the feed chute at least 100 mm in vertical distance from the food processing element. The sensor is disposed substantially away from the moving elements (i.e. food shredding plate) to avoid damage to the sensors and at the same time be able to sense the human hand/finger/arm being inadvertently put into the food processing element through the feed chute.

In a still further embodiment, the at least one sensor comprises a source and a detector. The source could be a signal transmitter. The detector could be a receiver to detect an object passing through. The source could be positioned right at the top of the feed opening. The detector could be disposed diagonally opposite to the source. The signals received from the sensor could be processed by the at least one signal processor to discriminate between discontinuous food pieces being entered and a feed continuous human finger, hand, arm reaching into the feed chute. This embodiment has the advantage that the sensor can easily be embedded onto the interior surface of the feed chute or on top of the feed chute.

In a still further embodiment, in operation, the at least one signal processor is configured to measure the signal interruption period, the signal interruption period being the time period for which the signal from the source is blocked by the passing food articles and not detected by the detector and to ascertain whether the signal interruption period is greater than a predetermined threshold and if so, initiate a signal to i) switch OFF the power supply to the food processor ii) notify the consumer that the power supply to the food processor is switched OFF.

When food articles (e.g., fruit or vegetable) pass through the feed opening, the signal will be interrupted/eclipsed/blocked for a few microseconds. No signal will be detected at the detector. Subsequently, the signal will again be detected at the detector. In operation, when a human hand grabs or reaches into the food chute, the detector will be blocked continuously.

When the consumer starts processing food, he will in time sequences feed pieces of food articles into the feed chute. These food articles will block the signal for few milliseconds approximately 50-200 milliseconds and later on the signal will be ON at the detector.

In a situation where the consumer starts to fiddle into the feed chute with his fingers, and subsequently his hand, the signal will be interrupted/eclipsed/shut off for more time approximately 500 milliseconds. The signal processor could be configured to initiate a signal to i) switch off the power supply to the food processor ii) notify the consumer appropriately. The notification helps to mitigate the risk of false alarms and ensure consumer safety. This could aid in confirming to the consumer that the food processor is switched OFF due to hand/arm/finger in the feed opening and not because of overload or fault in the food processor. The consumer can turn ON the food processor on releasing his hand/arm/finger. This embodiment provides a simple and easy method of discriminating hands/arm/finger, which are continuously connected to a human user, from food articles (e.g., fruits and vegetables or meat pieces).

In a still further embodiment, the at least one sensor is a light gate. The light gate could have a source and a detector. The source could be an infrared transmitter. The detector could detect an object passing through the light gate. The source or the light emitter could be positioned right at the top of the feed opening. The detector could be disposed diagonally opposite to the light emitter. This embodiment has the advantage that the light gate can easily be embedded onto the interior surface of the feed chute. The light gate is non-mechanical. There are no moving parts and hence it ensures undisturbed feeding of food articles.

In a still further embodiment, the predetermined threshold is 1000 milliseconds to detect consumers fiddling their hand/arm into the feed chute. In operation, for a split of a second the light will be interrupted/eclipsed/blocked by the food article (e.g., fruit and vegetable) fed through the feed chute and falling into the food processor. Based on experimentation, the interruption period/eclipse period/shut off/ blocked time is between 0.4 second for an apple and 0.7 second for a long carrot. When entering the feed opening with the human hand/arm/finger, the time to reach the dangerous parts of the food processor, is relatively longer than approximately 1 to 2 seconds. The signal processor could be configured to detect that the light is OFF for longer than 1 second, which is the predetermined threshold, and initiate a signal to switch off the food processor within the next 0.2 second. This ensures safety to the consumer. Further, this will give the consumer an experience that the feed process is not hampered. Furthermore, undisturbed feeding of food articles is ensured. Furthermore, the safety is ensured, in case the consumer tries to grab deep into the feed chute.

In a still further embodiment, the feed opening is dimensioned such that the average of the maximum and minimum cross-sectional dimensions of the feed opening is higher than 65.5 mm and the maximum cross-sectional dimension of the feed opening is higher than 76 mm.

The dimensions of the feed chute assembly are restricted by IEC standards. The average of the maximum and minimum cross-sectional dimensions of the feed opening should not exceed 45 mm for a meat mincer, for other processors not more than 65.5 mm. A maximum cross-sectional dimension of the feed opening should not exceed 76 mm. These size restrictions are laid down by the IEC standards to ensure consumer safe operation. On the other hand, these size restrictions necessitate cumbersome pre-cutting operations. The food articles have to be cut into smaller pieces in order to be fed through the feed chute assembly. This is tedious and needs additional effort. Hence, easy feeding of food articles is not possible.

This embodiment allows the dimensions of the feed opening to be increased, keeping the feed opening wide. This enables large pieces of food articles to be fed through the feed chute. There is no necessity of cumbersome pre-cutting operations. The food articles need not be cut into smaller pieces in order to be fed through the feed chute. This could save effort and time. This could allow easy feeding of the food articles.

This embodiment provides a wide feeding opening dimensioned to achieve easy feeding of food articles and at the same time ensure consumer safe operation. This is realized using non-mechanical elements. Hence it is maintenance free, produces no noise and vibration and easy to clean the feed chute. The invention provides ease of use, enhanced convenience and safety to the consumers. No additional operations are needed for the safety system.

These and other aspects of the invention will be apparent from and elucidated with reference to the embodiments described hereinafter.

BRIEF DESCRIPTION OF THE DRAWINGS

The above-mentioned aspects, features and advantages will be further described, by way of example only, with reference to the accompanying drawings, in which the same reference numerals indicate identical or similar parts, and in which.

DETAILED DESCRIPTION OF THE EMBODIMENTS

Food processors have become popular in recent years. Commercially available food processors have the ability to rapidly slice, pulp, grind or chop vegetables, fruits and meats. Generally, food processors comprise an electric motor connected to drive various interchangeable rotary blades (e.g., food shredding element). The rotary blades could be adapted to either slice, chop, grate or cut large pieces of food into smaller pieces. Food to be processed is fed through a vertical tubular feed chute. The tubular feed chute is generally located in eccentric position in relation to the rotating blade or on top of a rotating spindle/screw. A pusher whose size and shape correspond to the interior of the feed chute is used to push food articles downward into contact with the rotating blade or screw.

Figure 1:
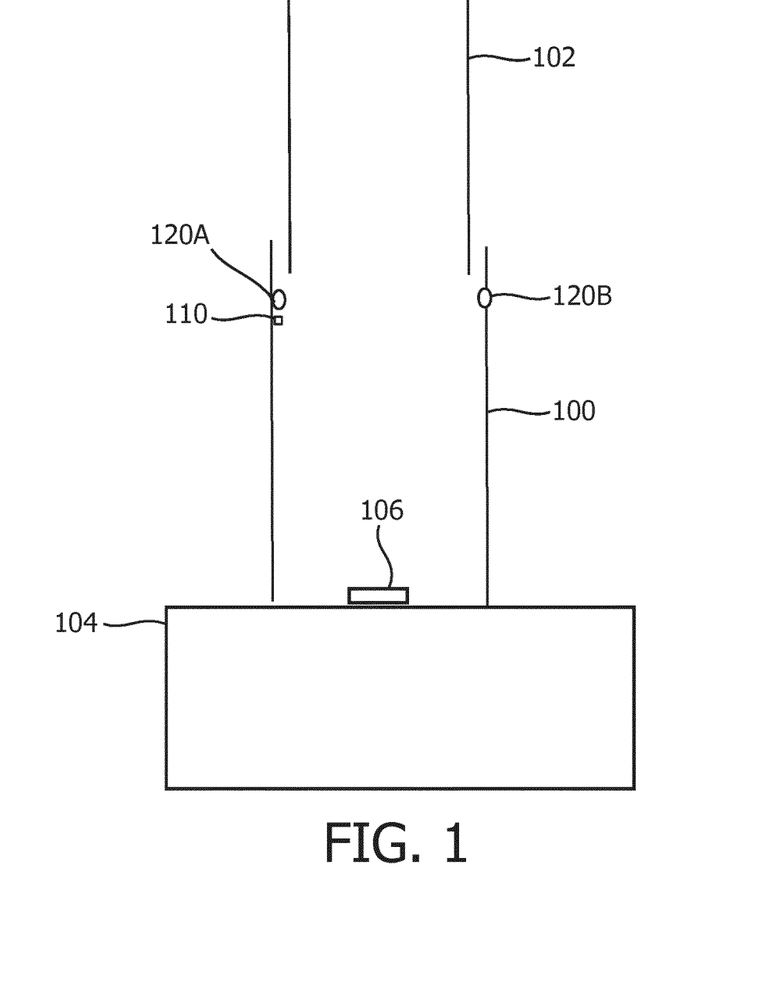
FIG. 1 illustrates an exemplary schematic feed chute according to an embodiment the present subject matter.

Referring now to FIG. 1, an exemplary feed chute 100 cooperates with a transparent pusher 102. The transparent pusher 102 is dimensioned to slide through the feed chute 100 to push the food articles into the food processor 104 for food processing.

The transparent pusher 102 is capable of letting the sensor signal pass through e.g., a pusher that is designed to pass visual or invisible light (Near-infrared, Ultraviolet etc.,) from an emitter to a detector/receiver. Further, the transparent pusher 102 is able to let the sensor signal pass through or guide the sensor signal to the receiver/detector when it is present in the feed chute.

A signal processor 110 is disposed on the interior surface or on top of the feed chute 100. The signal processor is provided with signal processing algorithms configured to discriminate between discontinuous food pieces being entered into the feed chute and a feed continuous human finger, hand, or arm of a consumer reaching into the feed chute appearing to be continuously fed into the feed chute. The signal processing algorithms are further configured to ascertain whether it is feed continuous human hand/arm/ finger and if so notify the consumer. This could prevent the consumer from harmful injuries.

A sensor 120 is disposed on the interior surface of the feed chute or on top of the feed chute. The signal processor 110 is configured to process signals received from the sensor 120 and discriminate between discontinuous food pieces being entered and a feed continuous human finger, hand or arm reaching into the feed chute.

The sensor 120 is disposed at least 100 mm in vertical distance from the food processing element 106. The sensor 120 is disposed substantially away from the moving elements (i.e., food shredding plate) to avoid damage to the sensor and at the same time be able to sense the human hand/finger/arm being inadvertently put into the feed chute.

The at least one sensor 120 comprises a source 120A and a detector/receiver 120B. The source could be a signal transmitter. The detector could be a receiver to detect an object passing through the feed chute. The source could be positioned right at the top of the feed opening. The detector could be disposed diagonally opposite to the source. The signals received from the sensor could be processed by the at least one signal processor 110 to discriminate between discontinuous food pieces being entered and a feed continuous human finger, hand, arm reaching into the feed chute. The sensor could easily be embedded onto the interior surface of the feed chute.

In operation, the at least one signal processor 110 is configured to measure the signal interruption period, the signal interruption period being the time period for which the signal from the source is blocked by the passing food articles and not detected by the detector 120B. The signal processor is further configured to ascertain whether the signal interruption period is greater than a predetermined threshold and if so, initiate a signal to i) switch OFF the power supply to the food processor 104 ii) notify the consumer that the power supply to the food processor is switched OFF.

When food articles (e.g., fruit or vegetable) pass through the feed opening, the signal will be interrupted/eclipsed for a few microseconds. No signal will be detected at the detector. Subsequently, the signal will again be detected at the detector. In operation, when a human hand grabs into the feed chute 100 with a finger, hand, and/or arm, the detector will be blocked continuously.

When the consumer starts processing food, he will in time sequences feed pieces of food articles into the feed chute. These food articles will block the signal for few milliseconds approximately 50-200 milliseconds and later on the signal will be ON at the detector.

In a situation where the consumer starts to fiddle into the feed chute with his fingers, and subsequently his hand, the signal will be interrupted/eclipsed/shut off for more time approximately 500 milliseconds. The signal processor 110 could be configured to initiate a signal to i) switch off the power supply to the food processor ii) notify the consumer appropriately. The notification helps to mitigate the risk of false alarms and ensure consumer safety. This could aid in confirming to the consumer that the food processor is switched OFF due to hand/arm/finger in the feed opening and not because of overload or fault in the food processor. Alternatively, the consumer can retreat his hand and press a quit button. The consumer can turn ON the food processor on releasing his hand/arm/finger. This embodiment provides a simple and easy method of discriminating hands/arm/finger from food articles (e.g., fruits and vegetables).

Figure 2A:
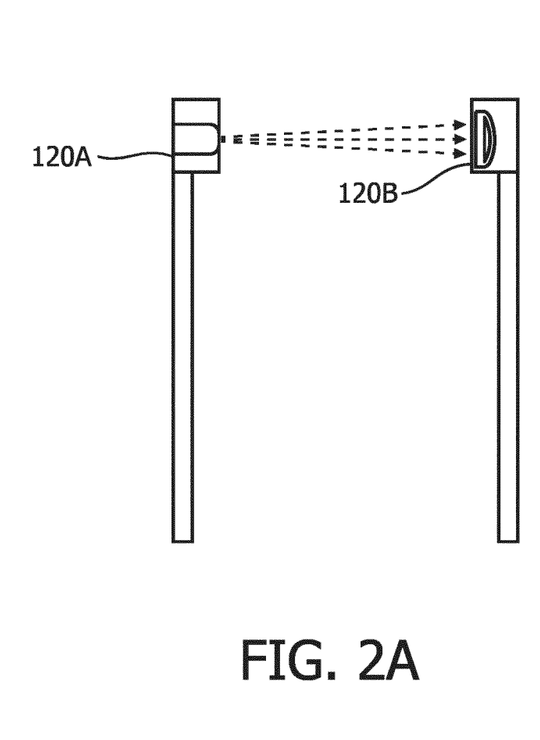
FIG. 2A FIG. 2G illustrate schematically an exemplary feed chute according to a further embodiment of the present subject matter.
Figure 2B:
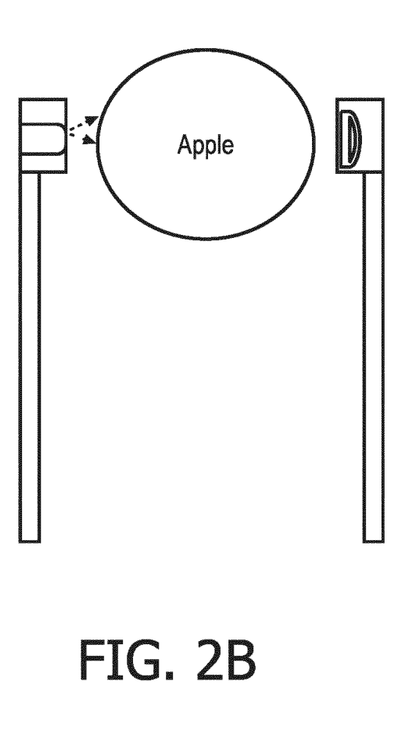
Figure 2C:
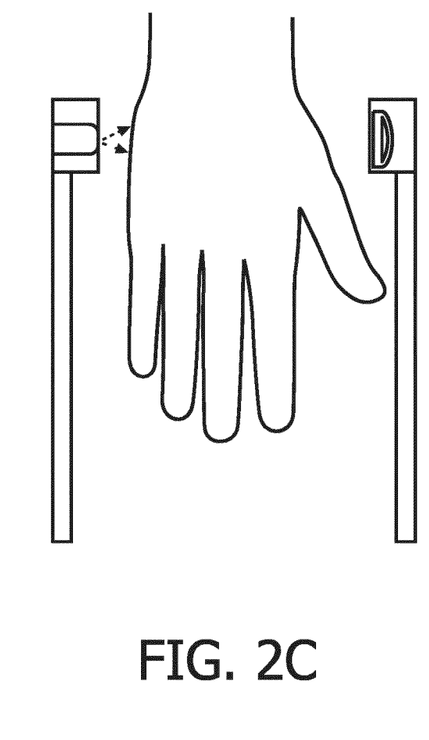
Figure 2D:
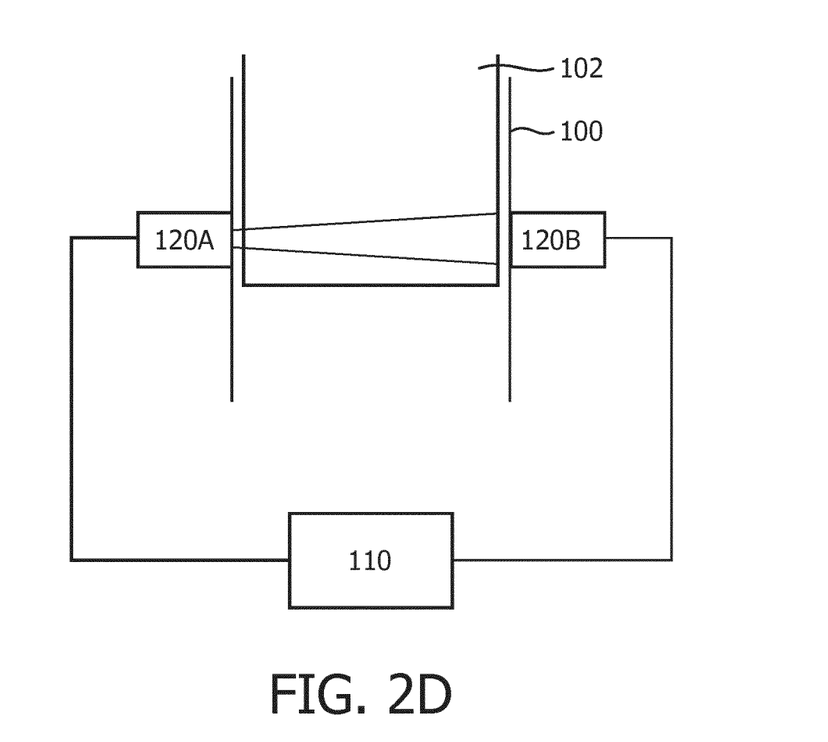
Figure 2E:
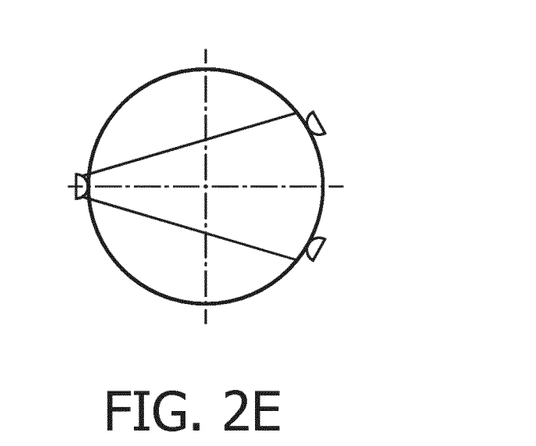

Referring now to FIG. 2A 2E, the sensor 120 disposed on the interior surface of the feed chute is a light gate. The light gate has a source 120A and a detector 120B. The source could be an infrared transmitter. The detector could detect an object passing through the light gate. The source or the light emitter could be positioned right at the top of the feed opening. The detector 120B could be disposed diagonally opposite to the light emitter/source. The light gate could be easily embedded onto the interior surface of the feed chute 100. The light gate is non-mechanical. There are no moving parts and hence it ensures undisturbed feeding of food articles.

Figure 2F:
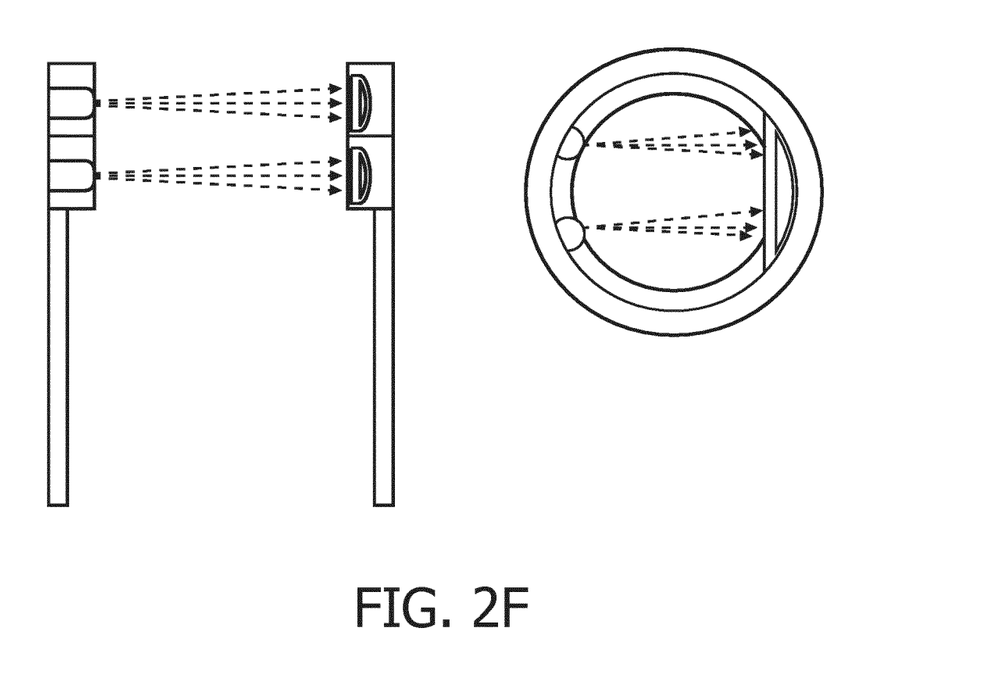

Referring now to FIG. 2F, in some embodiments two or more light sources could be provided to avoid 100% human hands/finger/arm passing the feed chute opening and to better discern between fruits and the human hand/finger/arm.

Figure 2G:
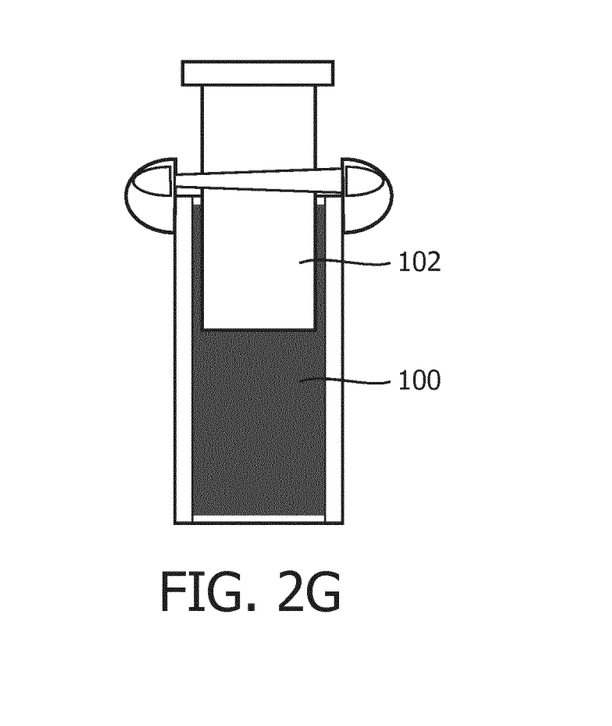

Referring now to FIG. 2G, in some embodiments, the light gate could be disposed on the top of the feed chute.

Figure 3:
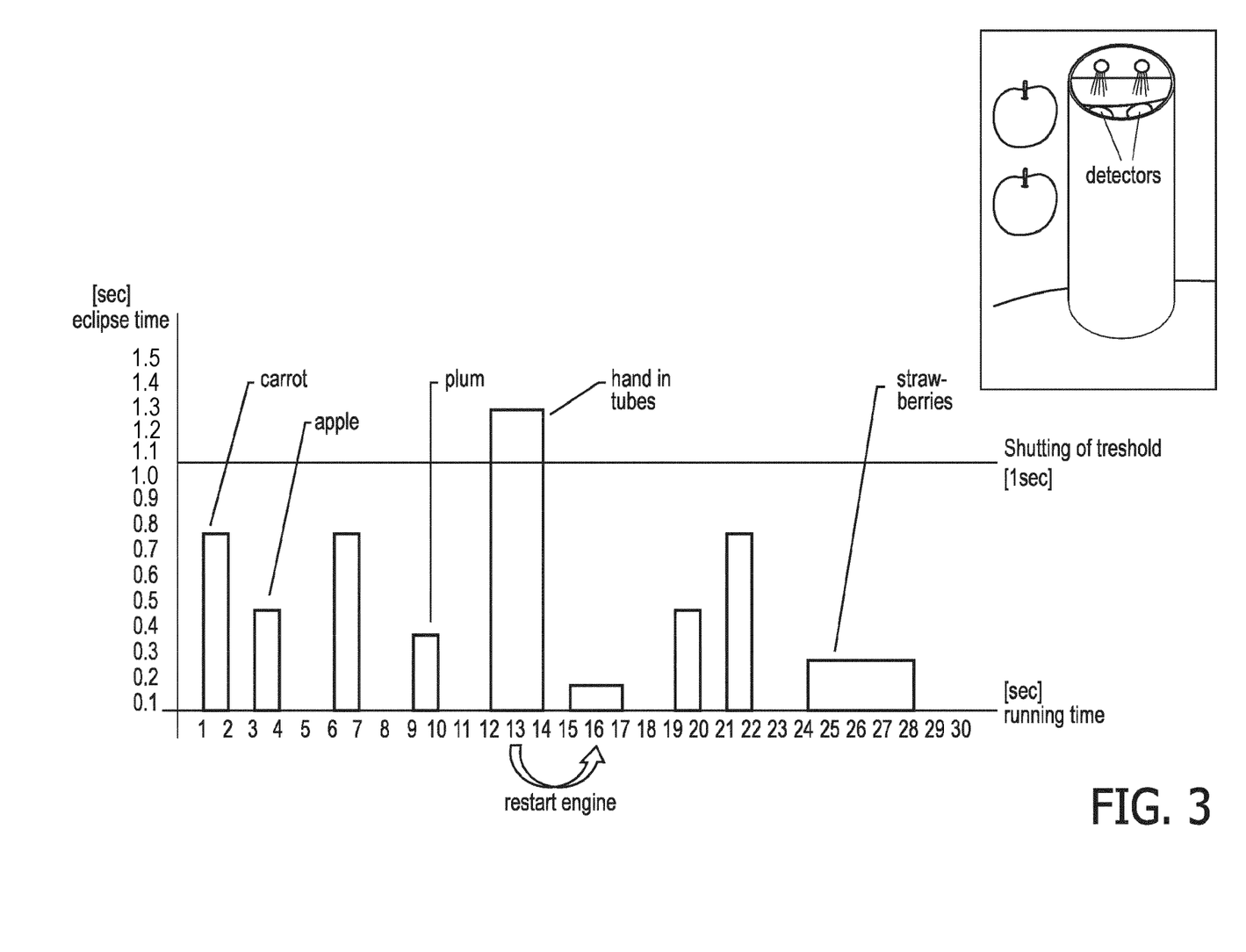
FIG. 3 illustrates a schematic exemplary operation of the feed chute according to an embodiment of the present subject matter.

Referring now to FIG. 3, when food article (e.g., fruit or vegetable) passes through the feed opening, the light will be eclipsed/blocked/interrupted for a few milliseconds. No light will be detected at the detector 120B. Subsequently, the light will again be detected at the detector. In operation, when a human hand grabs in, the detector will be black continuously.

When the consumer starts processing food, he will in time sequences feed pieces of food articles into the feed chute. These food articles will block the light gate for few milliseconds approximately 50-200 milliseconds and later on the light will be ON at the detector.

In a situation where the consumer starts to fiddle into the feed chute with his fingers, and subsequently his hand, the light signal will be blocked/eclipsed/shut off for more time approximately 500 milliseconds. The signal processor 110 could be configured to initiate a signal to i) to switch OFF the power supply to the food processor ii) notify the consumer appropriately. The notification helps to mitigate the risk of false alarms and ensure consumer safety. This could aid in confirming to the consumer that the food processor is switched OFF due to hand/arm/finger in the feed opening and not because of overload or fault in the food processor. The consumer can turn ON the food processor on releasing his hand/arm/finger. Hence, this provides a simple and efficient method of discriminating hand/finger/arm from food articles (e.g., fruits and vegetables).

Referring now to experimental data shown in FIG. 3, in operation, for a split of a second the light will be eclipsed by the food article (e.g., fruit and vegetable) fed through the feed chute and falling into the food processor 104. The eclipse period/interruption period/shut off/blocked time is between 0.4 second for an apple and 0.7 second for a long carrot. When entering the feed opening with the human hand/arm, the time to reach the dangerous parts of the food processor, is relatively longer than approximately 1 to 2 seconds. The signal processor 110 could be configured to detect that the light is ON for longer than 1 second, the predetermined threshold, and initiate a signal to i) switch off the food processor within the next 0.2 second ii) notify the consumer appropriately. This ensures safety to the consumer. Further, this will give the consumer an experience that the feeding process is not hampered. Furthermore, undisturbed feeding of food articles is ensured. Furthermore, the safety is ensured, in case the consumer tries to grab deep into the feed chute.

In some embodiments, thermo-piles could be used to measure human skin temperature to reliably distinguish human hand/finger/arm from food articles (e.g., fruits and vegetables).

In still some embodiments, skin sensors could be used to detect the presence of human skin. The skin sensor could use multiple LEDs each of a unique wavelength and a broadband photo-detector to measure the remission of light at multiple wavelengths from the food articles being analyzed. The characteristics of the spectral remission of the food article could be used to better discriminate human skin from food materials (e.g., banana, apple) that are not human skin. An alternative could be to measure the melanin content, which is a primary element contributing to the skin color. This could be a valuable piece of information to better distinguish human hand/arm/finger from food articles.

Alternately, blood flow imaging sensors could be used to further enhance the discrimination of human finger/hand/arm from food articles. The blood flow imaging sensor could detect the flow of blood in the food articles entering the feed chute. This could be a valuable piece of information to better distinguish human hand/arm/finger from food articles.

In some embodiments, a combination of sensors namely light gate, thermo-piles, skin sensors and blood flow imaging sensors could be appropriately configured to avoid 100%, hand/finger/arm passing into the feed chute and to better discern between food articles (e.g., banana, apples etc.,) and a human hand/finger/arm.

Figure 4:
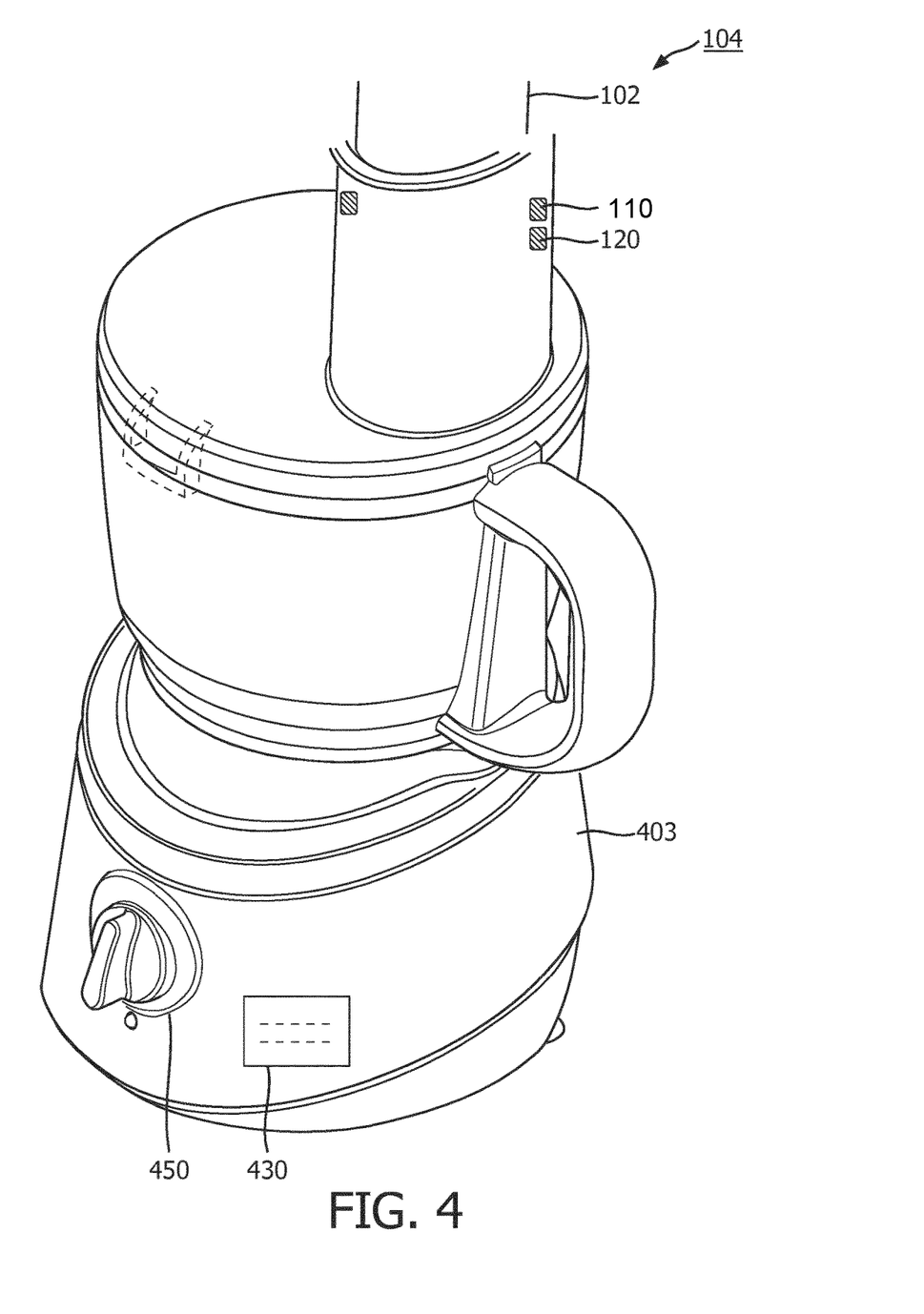
FIG. 4 illustrates an exemplary food processor according to an embodiment of the present subject matter.

FIG. 4 shows a food processor 104 having a feed chute 100 for feeding food articles to be processed by the food processor (slicing, blending, chopping, grating, pulping etc.,). A control unit 450 is provided on the outside of the housing 403. Food processor having a control unit for controlling the operation of the food processors i.e., to start or stop the food processor, to control the speed of the rotary blades, to provide a timer for the duration of the food processing, etc., are widely known. In an embodiment, the signal processor 110 is disposed on the interior surface of the feed chute 100.

The transparent pusher 102 cooperates with the feed chute 100 to push food articles into the food processor 104. The feed chute has a signal processor 110. The sensor 120 is disposed on the interior surface of the feed chute at the top portion from where the food articles enter into the food processor. In an embodiment, the sensor 120 is a light gate having a source 120A and a detector 120B. The source could be an infrared transmitter. The detector could be able to detect an object passing through the light gate. The source or the light emitter is positioned right at the top of the feed chute. The detector 120B is disposed diagonally opposite to the light emitter.

In operation, when food article (e.g., fruit and vegetable) passes through the feed chute, the light will be eclipsed for a few microseconds. No light will be detected at the detector. Subsequently, the light will again be detected at the detector. In operation, when a hand grabs in, the detector will be black continuously.

When the consumer starts processing food, he will in time sequences feed pieces of food articles into the feed chute. These food articles will block the light gate for few milliseconds approximately 50-200 milliseconds and later on the light will be ON at the detector.

In a situation where the consumer starts to fiddle into the feed chute with his fingers, and subsequently his hand, the light signal will be blocked/eclipsed/shut off for more time approximately 500 milliseconds. The signal processor 110 could be configured to initiate a signal to i) notify 430 the consumer appropriately (e.g., visual display/audio message) ii) the control unit 450 to stop the motor. Furthermore, the consumer could quit a safety switch or the on-off-taster, to restart the food processor.

Further, in operation, for a split of a second the light will be eclipsed by the food article (e.g., fruit and vegetable) fed through the feed chute and falling into the food processor. Based on experimentation, the interruption period/eclipse period/shut off/blocked time is between 0.4 second for an apple and 0.7 second for a long carrot. When entering the feed chute with the human hand/arm, the time to reach the dangerous parts of the food processor, is longer than approximately 1 to 2 seconds. The signal processor 110 could be configured to detect that the light is ON for longer than 1 second, which is the predetermined threshold, and initiate a signal to the control unit 450 to switch off the food processor within the next 0.2 second. The signal processor 110 could initiate the signal to the control unit 450 through wired/wireless or any other suitable known mechanisms. This ensures safety to the consumer. Further, this will give the consumer an experience that the feeding process is not hampered. Furthermore, undisturbed feeding of food articles is ensured. Furthermore, the safety is ensured, in case the consumer tries to grab deep into the feed chute.

Referring now to FIG. 4, in an embodiment the feed opening is dimensioned such that the average of the maximum and minimum cross-sectional dimensions of the feed opening is higher than 65.5 mm and the maximum cross-sectional dimension of the feed opening is higher than 76 mm.

The dimensions of the feed chute assembly are restricted by IEC standards. The average of the maximum and minimum cross-sectional dimensions of the feed opening should not exceed 45 mm for a meat mincer, for other food processors not more than 65.5 mm. A maximum cross-sectional dimension of the feed opening should not exceed 76 mm. These size restrictions are laid down by the IEC standards to ensure consumer safe operation. On the other hand, these size restrictions necessitate cumbersome pre-cutting operations. The food articles have to be cut into smaller pieces in order to be fed through the feed chute assembly. This is tedious and needs additional effort. Hence, easy feeding of food articles is not possible.

This embodiment allows the dimensions of the feed opening to be increased, keeping the feed opening wide. This enables large pieces of food articles to be fed through the feed chute. There is no necessity of cumbersome pre-cutting operations. The food articles need not be cut into smaller pieces in order to be fed through the feed chute. This could save effort and time. This could allow easy feeding of the food articles.

This embodiment provides a wide feeding opening dimensioned to achieve easy feeding of food articles and at the same time ensure consumer safe operation. This is realized using non-mechanical elements. Hence it is maintenance-free, produces no noise and vibration and easy to clean the feed chute. The invention provides ease of use, enhanced convenience and safety to the consumers.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A feed chute for a food processor, the feed chute comprising: a feed opening configured to receive a transparent pusher, the transparent pusher dimensioned to slide through the feed opening enabling a consumer to push food articles into a feed shredding element of the food processor; at least one sensor configured to detect a signal emitted across the feed opening, wherein the signal is transmissible across the feed opening through the transparent pusher when the transparent pusher is in the feed opening at the at least one sensor; and at least one signal processor disposed on a surface of the feed chute, wherein the at least one signal processor is configured to: measure a signal interruption period during which the signal is blocked from being emitted across the feed opening by an object passing through the feed opening; ascertain whether the signal interruption period is greater than a predetermined threshold, indicating that the signal is being blocked by a finger, hand and/or arm of the consumer; and initiate a control signal to i) switch OFF a power supply to the food processor and ii) notify the consumer that the power supply to the food processor is switched OFF when the signal interruption period is greater than the predetermined threshold.

2. The feed chute as claimed in claim 1, wherein the at least one sensor is disposed on an interior surface of at least one side of sides defining the feed opening.

3. The feed chute as claimed in claim 2, wherein the at least one sensor is positioned at least 100 mm in vertical distance from the food shredding element.

4. The feed chute as claimed in claim 3, wherein the at least one sensor comprises a signal source and a detector positioned across the feed opening from the signal source.

5. The feed chute as claimed in claim 4, wherein the at least one sensor is a light gate, and the signal source is a light source.

6. The feed chute as claimed in claim 5, wherein the predetermined threshold is 1000 milliseconds.

7. The feed chute as claimed in claim 1, wherein an average of maximum and minimum cross-sectional dimensions of the feed opening is higher than 65.5 mm, and a maximum cross-sectional dimension of the feed opening is higher than 76 mm.

8. A food processor, comprising: a food shredder configured to shred food articles; a feed chute defining a feed opening for receiving the food articles; a transparent pusher configured to slide through the feed opening enabling a consumer to push the food articles into the food shredder; a sensor positioned on the feed chute, the sensor comprising an emitter configured to transmit a signal across the feed opening, and a detector configured to receive the signal from the emitter across the feed opening, wherein the signal is transmissible across the feed opening through the transparent pusher when the transparent pusher is in the feed opening at the sensor; and a signal processor configured to: determine a signal interruption period during which the signal being transmitted from the emitter is blocked from being received by the detector by an object passing through the feed opening; compare the signal interruption period to a predetermined threshold; and initiate a control signal causing the food processor to switch OFF when the signal interruption period is greater than the predetermined threshold, indicating that the signal is being blocked by a finger, hand and/or arm of the consumer.

9. The food processor of claim 8, wherein the control signal further causes a notification to be provided to the consumer when the signal interruption period is greater than the predetermined threshold.

10. The food processor of claim 8, wherein each of the emitter and the detector is disposed on an interior surface of the feed chute.

11. The food processor of claim 10, wherein the detector is disposed directly opposite from the emitter.

12. The food processor of claim 10, wherein the detector is disposed diagonally opposite from the emitter.

13. The food processor of claim 8, wherein each of the emitter and the detector is disposed at a top of the feed chute.

14. The food processor of claim 8, wherein the predetermined threshold is at least 1000 milliseconds.

15. The food processor of claim 8, wherein each of the emitter and the detector is positioned at least 100 mm in vertical distance from the food shredder.

16. The food processor of claim 8, wherein an average of maximum and minimum cross-sectional dimensions of the feed opening is higher than 65.5 mm, and a maximum cross-sectional dimension of the feed opening is higher than 76 mm.

* * * * *